April 5, 1949.  F. A. DOLL  2,466,161
PROJECTION GAUGING DEVICE FOR
PISTON RINGS AND THE LIKE
Filed April 17, 1946
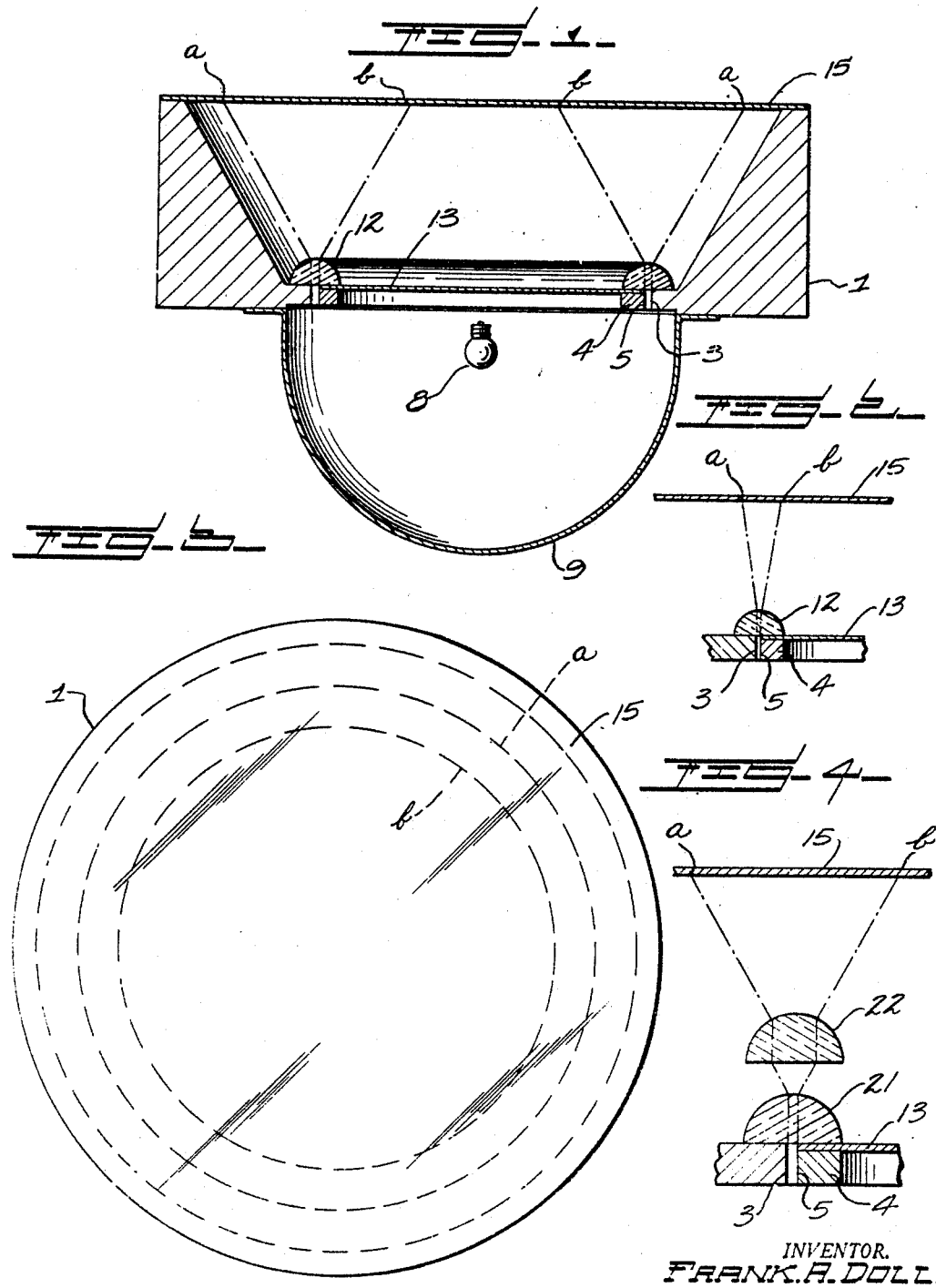
INVENTOR.
FRANK A. DOLL.
BY
ATTORNEYS Patented Apr. 5, 1949

2,466,161

UNITED STATES PATENT OFFICE 2,466,161

PROJECTION GAUGING DEVICE FOR PISTON RINGS AND THE LIKE

Frank A. Doll, Detroit, Mich., assignor to Link Engineering Company, Detroit, Mich., a co-partnership composed of Herbert W. Link, Martha F. Link, and Frank A. Doll Application April 17, 1946, Serial No. 662,719½

2 Claims. (Cl. 88—24)

This invention relates to the gauging of clearances or spacings for work pieces and it is directed particularly to the gauging of work pieces which are formed substantially in a closed area such, for example, as a piston ring.

In order to disclose and demonstrate the invention piston rings have been selected as exemplary work pieces. It is, needless to say, essential and desirable that piston rings be so constructed that very close tolerances are obtained between the periphery of the piston ring and the cylinder with which it is to operate. This is particularly true of engines which embody fine workmanship such as the engines for aircraft.

The tolerances for the periphery of piston rings in such engines are held very close and it has been difficult to accurately check the piston rings. While some devices have been constructed for checking the rings, a good deal of reliance was made on the eyes of the particular person making the check and when several people are checking as many different checking characteristics are encountered. Moreover, when a person checking such close workmanship works through the day, the eye seems to vary or perhaps become weary in time so that the precision maintained by that operator at one time of day is different from that maintained by the same operator by another time of day. Accordingly, it is the aim of this invention to provide a simple but effective method and apparatus of checking a work piece such as a piston ring for clearances and to this end a system of magnification is provided. Difficulties are encountered here, because, for example, if a magnification of 100 diameters is desired, a six inch diameter piston ring would result in an image of 600 inches in diameter. This, of course, is out of the question. Accordingly, the invention contemplates a system wherein only the clearance is magnified without a magnification of the body of the ring itself.

To this end, a ring is placed in a proper gauge and a suitable light source is employed for directing light to the interfaces of the piston ring and gauge and the light which passes through the clearance, if any, is then passed through one or more lenses. The light, representing the clearance image, is cast upon a screen and the magnified light beam may be easily seen while the overall diameter of the image is not appreciably increased over that of the piston ring.

One structure for carrying out the invention is disclosed in the accompanying drawings:

In these drawings:

Fig. 1 is a sectional view taken through a gauging device constructed in accordance with the invention showing an exaggerated condition.

Fig. 2 is a view similar to Fig. 1 but showing a lesser exaggeration.

Fig. 3 is a top plan view showing the screen with an image cast thereon.

Fig. 4 is a view showing a modified form of the invention wherein multiple lenses are employed.

The gauge shown is of a simple form adequate for demonstrating the invention and it comprises a body 1 formed with a proper circumferential gauging surface or face 3 within which a piston ring 4 is adapted to be placed.

The gauging face 3 represents the counter part of the cylinder with which the ring is to be used, and the clearance or clearances, if any, to be checked are those between the outer periphery 5 of the ring and the gauging face 3.

Positioned on one side of the gauging face is a suitable light source 8 and a reflector 9 which preferably is a parabolic reflector. The light rays from the source are reflected and thereby directed at the interfaces 3 and 5 of the gauge and the ring. Incidentally, it may be pointed out that Fig. 1 shows the interfaces spaced apart in an exaggerated manner.

On the opposite side of the gauging face from the light source is placed a lens generally indicated at 12. This lens may be of glass or a suitable plastic, such as Lucite. It is circular in form and lies over the interfaces of the gauge and the ring as illustrated. In the area bounded by the ring, there may be placed an opaque sheet or partition 13 to prevent the passage of light therethrough.

Spaced from the lens is a suitable screen 15 and which may be placed upon or immediately adjacent to the upper edges of the body 1 as indicated. In this connection, it is to be understood that the term "upper" or the term "lower" is used with respect to the drawing and it is not necessary to have the gauge so positioned in actual practice.

The light beams from the source 8 are reflected by the reflector as indicated by the direction lines at the interfaces 3 and 5 and such light beams pass through any clearance or space between the interfaces. The beams of light which thus pass through the interfaces pass through the lens 12 and leave the lens in a diverging manner as illustrated so that the clearance is magnified upon the screen 15. As indicated in Fig. 1, clearance between the interfaces would be shown by a band of light with an outer periphery at $a$ and an inner periphery at $b$. Thus, it will be seen that the clearance between the interfaces is magnified while the overall diameter of the piston ring is increased only an inconsequential amount.

It is to be stated again that Fig. 1 is materially exaggerated. In a practical gauging device the arrangement may be substantially that a clearance of .001 of an inch will show up on the screen with a width of .09375. In Fig. 2 the arrangement is shown similar to Fig. 1 but with less exaggeration, it being appreciated, of course, that it is not feasible to show on the drawing herein clearances such as those mentioned above. Fig. 3 is a plan view showing the screen 15 and illustrating a band of light of circular form which demonstrates a magnification of the clearances between the interfaces of the ring and gauge. No attempt is made in Fig. 3 to demonstrate the irregularities which may be expected with improperly made rings.

In Fig. 4 a modified form is shown but parts which are the same as those previously described bear the same reference characters. In this form, a multiple system of lenses is used to increase the magnification. Two superimposed lenses are shown such as the lens 21 and the lens 22. The lens 21 provides its magnification and the lens 22 provides additional magnification to thus increase the cross dimension of the image. This does not materially increase the overall diameter but increases the radial dimension between the outer periphery $a$ of the image and the inner periphery $b$.

I claim:

1. A gauging device for checking piston rings comprising, a gauge member having a part with an internal gauging face adapted to receive a piston ring and the internal gauging face of the said part disposed in interfacial relationship, light source means on one side of the said part for directing light toward the location of the interfaces, a light spreading lens of ring form for overlying the piston ring and said part of the gauge member in immediate proximity thereto and covering the line of intersection formed by the interfaces, and a screen positioned substantially parallel to the said gauge part and spaced therefrom, upon which light which passes through clearance between the interfaces and which is spread as it passes through the lens is cast as an image widened both radially inwardly and outwardly from the position of the interface.

2. A gauging device for checking piston rings comprising, a gauge member having a part with an internal gauging face adapted to receive a piston ring with the outer peripheral face of the piston ring and the internal gauging face of the said part disposed in interfacial relationship, light source means on one side of the said part for directing light toward the location of the interfaces, a light spreading lens of ring form for overlying the piston ring and said part of the gauge member in immediate proximity thereto and covering the line of intersection formed by the interfaces, a screen positioned substantially parallel to the said gauge part and spaced therefrom, upon which light which passes through clearance between the interfaces and which is spread as it passes through the lens is cast as an image widened both radially inwardly and outwardly from the position of the interface and an opaque element for preventing passage of light through the open area defined by the piston ring.

FRANK A. DOLL.

REFERENCES CITED

The following references are of record in the file of this patent:

UNITED STATES PATENTS

| Number | Name | Date |
|---|---|---|
| 1,202,223 | Redfield | Oct. 24, 1916 |
| 1,531,303 | Miller | Mar. 31, 1925 |
| 1,547,514 | Mueller | July 28, 1925 |
| 1,712,147 | Kelsea | May 7, 1929 |
| 1,892,265 | Cummins | Dec. 27, 1932 |
| 1,930,273 | Hutchinson | Oct. 10, 1933 |
| 2,012,736 | Taylor | Aug. 27, 1935 |
| 2,155,248 | Adams et al. | Apr. 18, 1939 |
| 2,170,970 | Johnson | Aug. 29, 1939 |
| 2,259,902 | McCain | Oct. 21, 1941 |
| 2,393,705 | Olson et al. | Jan. 29, 1946 |